US007734399B2

(12) United States Patent
Green et al.

(10) Patent No.: US 7,734,399 B2
(45) Date of Patent: Jun. 8, 2010

(54) OUTRIGGER OBSTRUCTION DETECTION SYSTEM FOR AERIAL FIRE TRUCKS

(75) Inventors: Jon M. Green, Mountville, PA (US); Brian S. Ritchey, Manheim, PA (US)

(73) Assignee: American LaFrance, LLC, Summerville, SC (US)

( * ) Notice: Subject to any disclaimer, the term of this patent is extended or adjusted under 35 U.S.C. 154(b) by 699 days.

(21) Appl. No.: 11/704,514

(22) Filed: Feb. 9, 2007

(65) Prior Publication Data

US 2007/0294014 A1 Dec. 20, 2007

Related U.S. Application Data

(60) Provisional application No. 60/766,777, filed on Feb. 10, 2006.

(51) Int. Cl.
*G05D 1/02* (2006.01)

(52) U.S. Cl. ........................... 701/50; 701/36; 701/300

(58) Field of Classification Search ................... 701/50, 701/1, 36, 300, 29–35; 280/6.156, 6.155
See application file for complete search history.

(56) References Cited

U.S. PATENT DOCUMENTS

| | | | | |
|---|---|---|---|---|
| 5,160,055 A * | 11/1992 | Gray | | 212/278 |
| 7,107,129 B2 * | 9/2006 | Rowe et al. | | 701/1 |
| 7,184,862 B2 * | 2/2007 | Pillar et al. | | 701/1 |
| 7,274,976 B2 * | 9/2007 | Rowe et al. | | 701/1 |
| 7,277,782 B2 * | 10/2007 | Yakes et al. | | 701/22 |
| 7,451,028 B2 * | 11/2008 | Pillar et al. | | 701/50 |

* cited by examiner

*Primary Examiner*—Richard M. Camby
(74) *Attorney, Agent, or Firm*—Angelica M. Colwell; Nexsen Pruet, LLC

(57) ABSTRACT

An Outrigger Obstruction Detection System for an Aerial Fire Truck that will warn the driver of an impending obstruction to an outrigger prior to full extension of the outrigger. The system comprises ultrasonic sensors located at or near each outrigger assembly on the aerial fire truck, which can be programmed to detect an object within the travel range of the outrigger. In addition, a control/indicator panel is mounted in the cab of the aerial fire truck. The control/indicator panel is positioned in the cab to allow the driver physical and visual access. The control/indicator panel contains the power switch, diagram of the truck and indicator lights used to warn the driver of an obstruction. The sensors provide an electrical signal to a control/indicator panel located in the cab of the aerial fire truck to alert the driver if an object is detected. This alert allows the driver to reposition the truck to clear the obstruction, which in turn reduces the time to react to the emergency. The ultrasonic sensors are affixed to the aerial fire truck via a pivotal mounting assembly, which allows proper sensing alignment to be achieved.

31 Claims, 6 Drawing Sheets

OUTRIGGER OBSTRUCTION DETECTION SYSTEM FOR AERIAL FIRE TRUCKS

CROSS-REFERENCE TO RELATED APPLICATION

This application claims priority on U.S. Provisional Application Ser. No. 60/766,777, filed Feb. 10, 2006, entitled Outrigger Obstruction Detection System for Aerial Fire Trucks.

FIELD OF THE INVENTION

The present invention generally relates to aerial fire trucks and particularly to an outrigger obstruction detection system (OODS) to allow the driver to park the truck in a position where no obstructions will be in the way of the outriggers when the outriggers are extended.

BACKGROUND OF THE INVENTION

When the aerial apparatus of a fire truck is used, outriggers are extended to provide support for the chassis by widening the support base of the fire truck. When the aerial fire truck arrives on a scene, the driver of the fire truck must position the fire truck so that there are no obstructions to prevent the outriggers from fully extending.

The task of positioning an aerial fire truck at the scene of a fire/emergency involves many factors, including but not limited to the location of the fire/emergency; overhead obstacles such as trees, guide wires, electric wires, telephone wires, overhanging structures; obstacles such as telephone poles, vehicles, garbage dumpsters, buildings, and curbs, sidewalks, and slopes in terrain. Each of these obstacles need to be quickly evaluated by the driver of the aerial fire truck in order to effectively and efficiently position the truck in order to employ the aerial device to attack the fire/emergency.

One of the major complaints of fire fighters is the inability to effectively position the aerial fire truck to ensure that the outrigger will not be obstructed when being extended. It is important that the outriggers be fully extended. If the outrigger cannot be fully extended, the safety features of the aerial device will have to be overridden in order to operate the aerial device. This potentially puts the fire fighters in jeopardy, along with those being rescued.

In order to set up an aerial fire truck at the scene of a fire, the driver of the fire truck must position the truck in such a way as to not obstruct the outward movement of the outriggers. Currently, this is accomplished through experience of the driver visually determining whether an obstruction exists. If the driver was not correct in his judgment, the truck might have to be repositioned after a failed attempt to fully extend the outriggers. This increases the response time of the fire fighters to attack the fire/emergency. In other words, someone's house continues to burn; someone trapped in the building might be exposed to the fire/carbon monoxide/smoke longer; or someone might be swept downstream by the rushing currents because they could not hang on any longer. This could all be due to the environment surrounding the fire/emergency and the false judgment of the driver of the aerial fire truck.

Time is of the essence when emergency services such as fire fighters are called to a fire/emergency. If the aerial fire truck arrives on the scene, stops, and then must be repositioned because the initial stopping point has obstructions preventing the outriggers from fully extending, valuable time is lost which can lead to unnecessary property damage, bodily injury and even death.

Therefore, it would be advantageous for the fire fighters to ensure that the aerial fire truck is positioned at the scene so that there are no obstructions to prevent the outriggers from extending. Further, it would be advantageous to have a system and method for ensuring that obstructions do not prevent the outriggers from being extended thereby preventing valuable time from being wasted due to repositioning the aerial fire truck.

SUMMARY OF THE INVENTION

The advantages of the invention are provided by an outrigger obstruction detection apparatus for an aerial fire truck having an outrigger comprising an outrigger zone defined by an area occupied by the outrigger when the outrigger is in an extended position; a sensor carried by the fire truck for detecting an obstruction within the outrigger zone; and a warning indicator operatively associated with the sensor so that the warning indicator is actuated when the sensor detects an obstruction in the outrigger zone; a method for detecting outrigger obstructions for an aerial fire truck having an aerial apparatus comprising the steps of detecting whether an obstruction is present within the outrigger zone defined by an area occupied by an extended outrigger of the fire truck through use of a sensor; and actuating a warning indicator carried by the fire truck if an obstruction is detected within the outrigger zone; an outrigger obstruction detection apparatus comprising an aerial fire truck having an aerial apparatus; an outrigger carried by the aerial fire truck having an extended position and a retracted position; an outrigger zone defined by an area occupied by the outrigger when the outrigger is in the extended position; a sensor carried by the fire truck for detecting an obstruction within the outrigger zone; and a warning indicator operatively associated with the sensor so that the warning indicator is actuated when the sensor detects an obstruction within the outrigger zone; an outrigger obstruction detection apparatus for an aerial fire truck having an outrigger comprising a computer readable medium carried by the fire truck; a sensor in communications with the computer readable medium for detecting an obstruction within an outrigger zone defined by an area occupied by the outrigger when the outrigger is in an extended position; a warning indicator in communications with the computer readable medium; and a set of computer readable instructions embodied in the computer readable medium for receiving a detection signal from the sensor when an obstruction is detected within the outrigger zone and actuating the warning indicator once the detection signal is received.

BRIEF DESCRIPTION OF THE DRAWINGS

The invention will be more readily understood by referring to the specification and the drawings that are a part thereof.

DETAILED DESCRIPTION OF THE INVENTION

Figure 1:
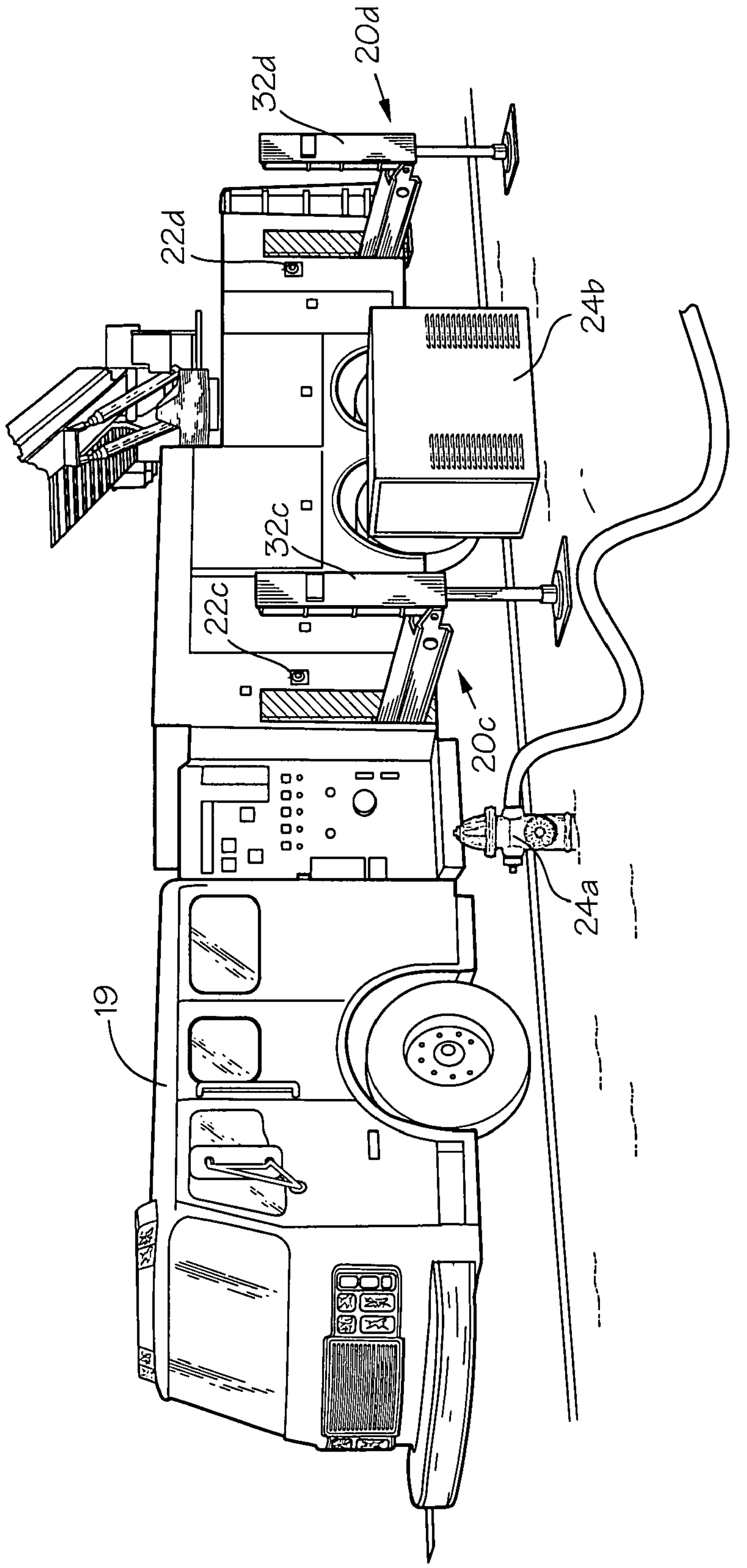
FIG. 1 is a perspective view of an aerial fire truck that has arrived at the scene of an emergency showing outriggers extended and a potential obstruction at the left of the truck.

FIG. 1 depicts an aerial view an aerial fire truck 19 that has just arrived at the scene of the fire. It is up to the driver to position the aerial fire truck so that the truck's outriggers can be fully extended in order to safely operate the aerial device. Left front outrigger 20*c* and left rear outrigger 20*d* are shown in the extended position. Outriggers provide stabilization for the fire truck when the aerial apparatus is in operation, and particularly, when the aerial swings to a side of the fire truck chassis.

Mounted next to each outrigger are ultrasonic sensors shown as 22*c* and 22*d* on the left side of the fire truck. There are potential obstructions 24*a* and 24*b* located near the rear of the aerial fire truck 19 in potential conflict with the outrigger 20*c* and 20*d* from being extended. In the preferred embodiment, ultrasonic sensors are used. Other sensor technologies, such as lasers, tactile sensors, and infrared sensors were also considered, but found to have limitations or unneeded complexity to accomplish the same task as the ultrasonic sensors.

Figure 2:
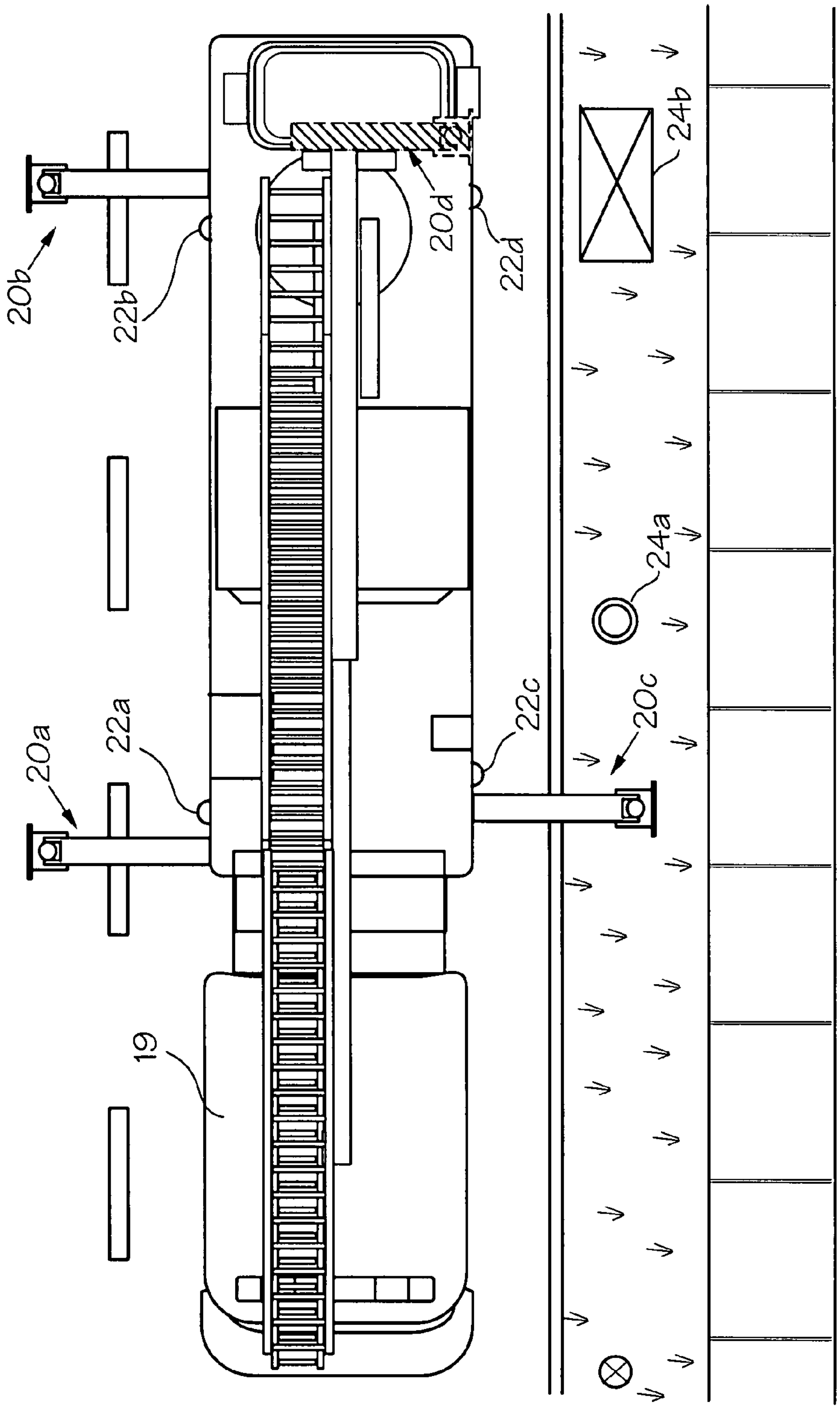
FIG. 2 is a top view of an aerial fire truck that has arrived at the scene of an emergency showing outriggers extended and a potential obstruction at the left of the truck.

FIG. 2 depicts the fire truck from the top. Fire truck 19 is shown arriving at the scene of the fire/emergency. Outriggers 20*a* through 20*c* are shown extended to provide support for the fire truck when the aerial is in operation. However, outrigger 20*d* cannot be extended due to obstruction 24*b* which prevents outrigger 20*d* from fully extending. Therefore, the fire truck needs to be repositions so that outrigger 20*d* can be fully extended and not be obstructed by obstructions 20*a* or 20*b*. Sensors 22*a* through 22*d* are shown carried by the fire truck and positions in close proximity to outriggers 22*a* through 22*d*.

Figure 3:
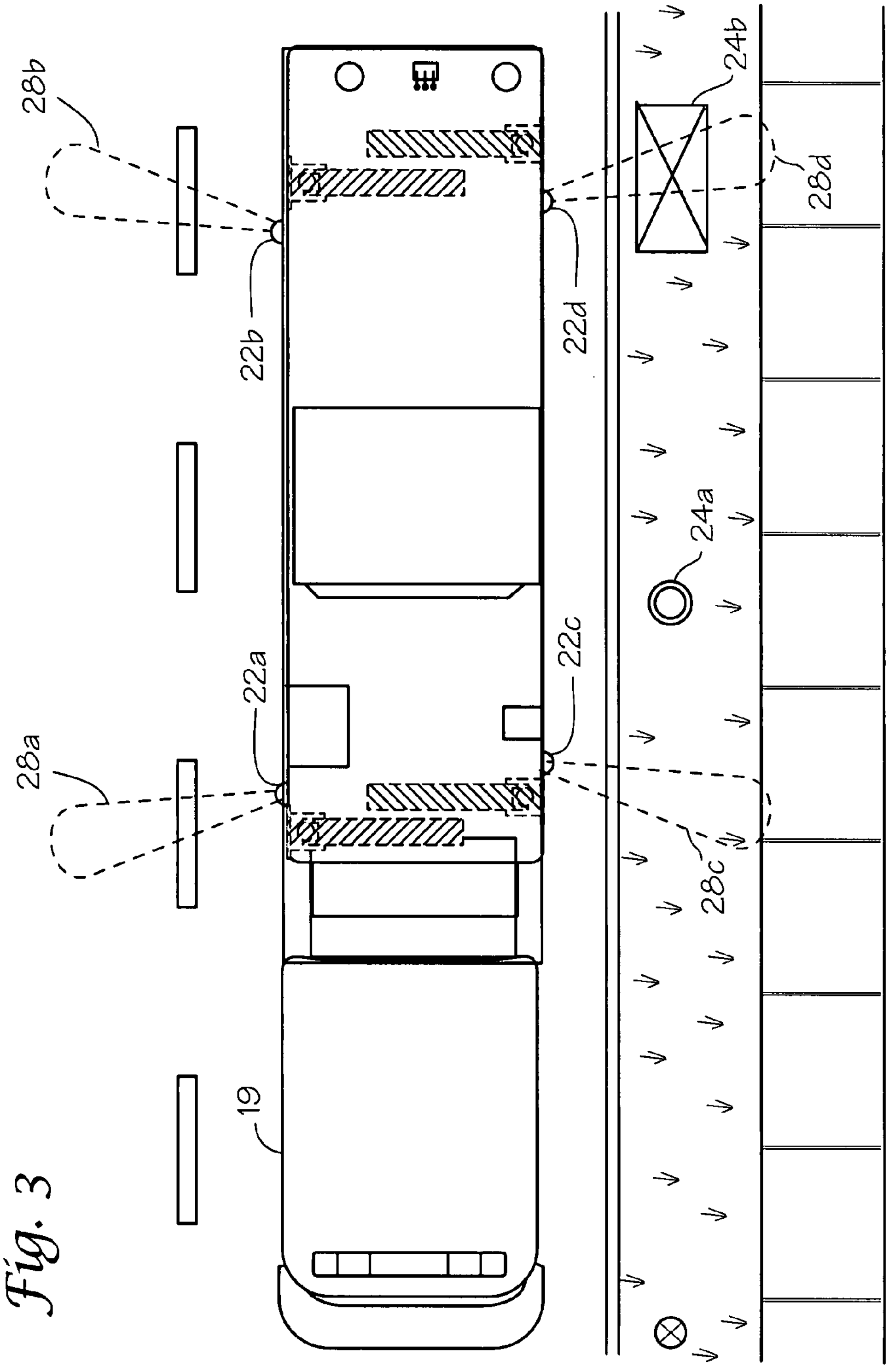
FIG. 3 is a top view of an aerial fire truck that has arrived at the scene of an emergency showing an obstruction at the left rear of the truck preventing the left rear outrigger from being full extended.

FIG. 3 shows the top of the fire truck (aerial apparatus not shown) with the outriggers in a retracted position. Sensor 22*a* is able to determine whether there is an obstruction within outrigger zone 28*a*. Outrigger zone 28*a* is an area defined by the space occupied by outrigger 20*a* when outrigger 20*a* is fully extended. As shown, there are no obstructions within outrigger zone 28*a* preventing outrigger 22*a* from being fully extended. Therefore, sensor 22*a* detects no obstructions in outrigger zone 28*a*. Similarly, sensors 22*b* and 22*c* are able to detect whether obstructions exist within outrigger zones 28*b* and 28*c* respectively. As shown, there are no obstructions within outrigger zones 28*b* or 28*c*. However, obstruction 24*b* is contained within outrigger zone 28*d* so that sensor 22*d* detects that there is an obstruction within outrigger zone 28*d* preventing outrigger 22*d* from being full extended. It should be known that the sensor beams 18*a* through 18*d* need not cover the same area as outrigger zones 28*a* through 28*d*, respectively. Rather, the outrigger zone need only be contained within the sensor beam and operatively configured to detect an obstruction within the outrigger zone.

For example, ultrasonic sensors output is dependent on the comparison at the time taken for an echo to return. The distance to an object is proportional to the distance to the object. Further, an ultrasonic proximity sensor has output whose intensity can be dependent on the distance of an object from the sensor. Therefore, an ultrasonic sensor, including a transducer or proximity sensor, can determine whether an object is within a certain distance and therefore within the outrigger zone.

Referring to FIG. 3, sensors 22*c* through 22*d* may have sensing zones shown as 18*a* through 18*d*, respectively. However, the sensors can be configured to determine if an obstruction is within the outrigger zone, a zone smaller than the area of the sensing zone.

Figure 4:
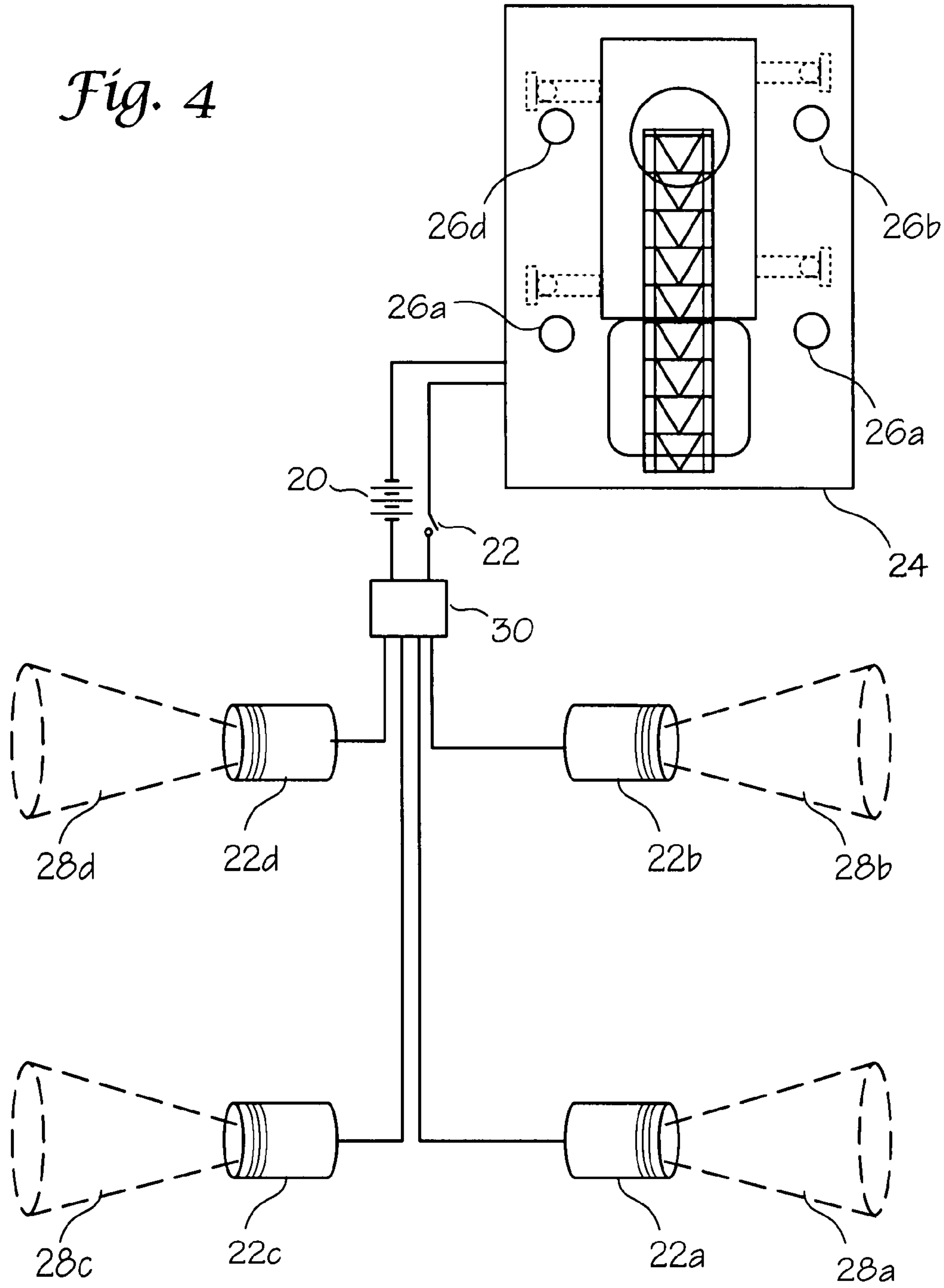
FIG. 4 is a is a top view of an aerial fire truck showing the outriggers retracted and the outrigger zones; and, FIG. 5 is a schematic of the invention.

FIG. 4 is a schematic of the invention. Sensors 22*a* through 22*d* are shown associated with outrigger zones 28*a* through 28*d* respectively. The sensors are connected to a power supply 20 and can have a switch 22. Warning panel 24 can have warning indicators 26*a* through 26*d* which can be connected to the sensors. Warning indicators 26*a* through 26*d* are in communications with sensors 22*s* through 22*d* respectively so that when an obstruction is detected within the outrigger zone, the associated sensor signal is used to actuate the corresponding warning indicator on the warning panel. Further, the warning panel can have a representation of a view of the fire truck approximating the location of the outriggers in relation to the fire truck chassis. The warning indicators can be located on the warning panel so that when actuated, the fire truck driver is provided with an indication of which outrigger zone contains the obstruction and therefore can reposition the fire truck accordingly.

After the driver has been warned of the obstruction 24*d* by actuated warning indicator 26*d*, corrective action can be employed such as pull the aerial fire truck 19 forward until obstruction 24*b* is not longer detected within outrigger zone 28*d*. Clearance of obstruction 24*d* is completed when sensor 22*d* no longer detects obstruction 24*b*. Warning indicator 26*d* on warning panel 24 is no longer illuminated, providing a "clear" state to the driver.

Switch 22 can be operatively associated with the parking brake of the fire truck so that switch 22 is closed when the parking brake is applied. Switch 22 can be operatively associated with the power system of the aerial apparatus so that when power is applied to the aerial apparatus, switch 22 is closed. A relay 30 can be included so that the sensor signals can be transmitted to relay 30 to actuate the corresponding warning indicator when the sensor detects an obstruction in the respective outrigger zone.

Computer readable instructions embodied in a computer readable medium as well as electrical circuitry can be operatively associated with the sensors so that when the sensor detects an object within its sensing zone, the computer readable instructions determine whether the object is within the outrigger zone and the corresponding warning indicator can be actuated indicating that an obstruction exists within the outrigger zone.

Figure 5:
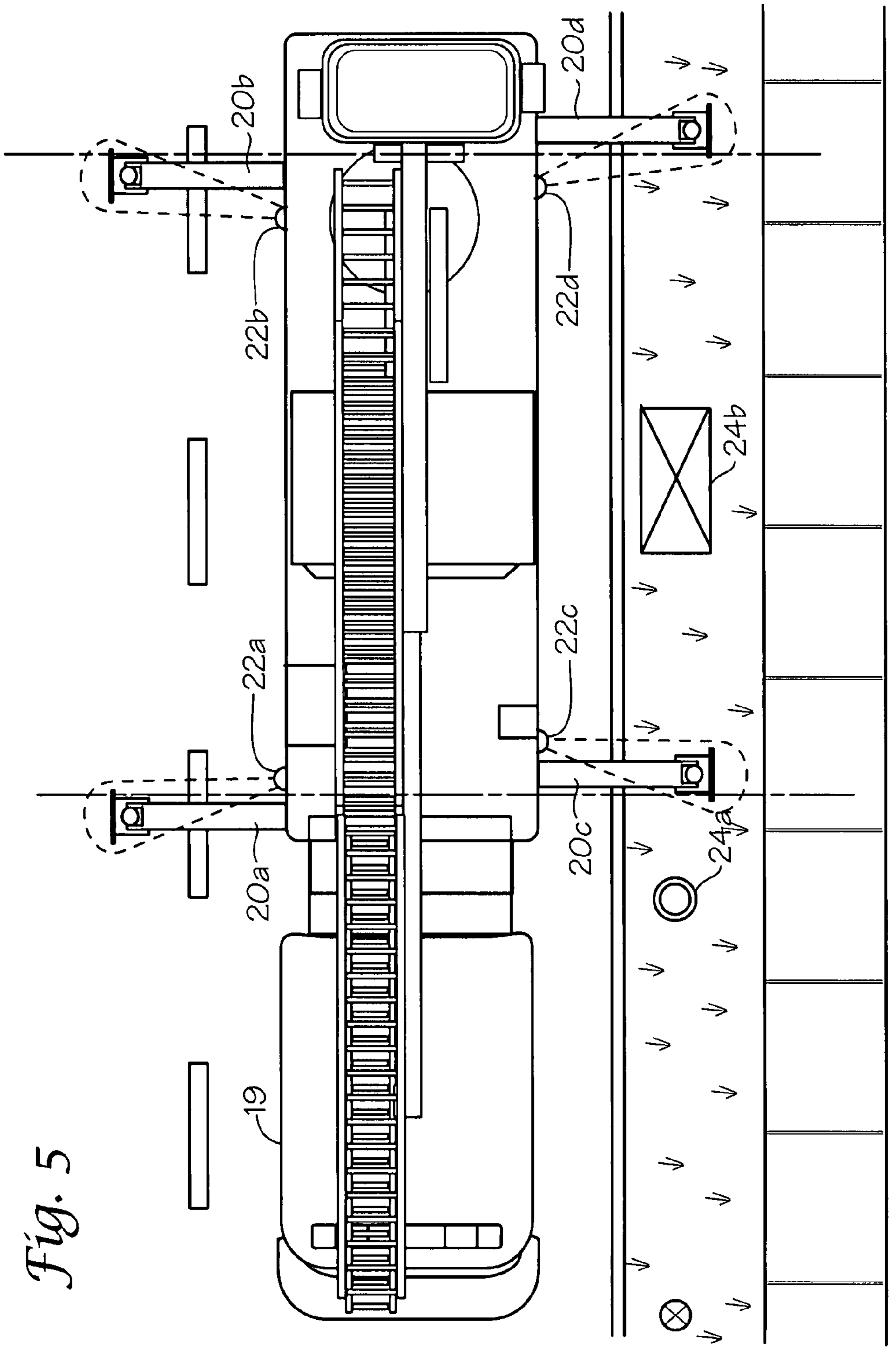

FIG. 5 shows a top view of the fire truck when the fire truck has been positions so that there are no obstructions in the outrigger zones 28*a* through 28*d*. When the warning panel indicates that there is an obstruction within an outrigger zone, the driver of the fire truck can reposition the fire truck until the previously actuated warning indicator no longer is actuated thereby representing that no obstructions re present in the outrigger zones 28*a* through 28*d*.

Ultrasonic sensors emit sound pulses through a diaphragm on the front of the sensor. The sound pulses emanate from the sensor in a predetermined pattern known as the sensor beam. When an object passes through the sensor beam, the sound pulses are reflected back to the sensor diaphragm. The sensor's electronics monitor the pulse reflection to determine an object is obstructing the beam. When an obstruction is detected, the sensor sends a signal output to representing that the sensor has detected an object within the sensor beam.

A relay can be used between sensors 22*a*, 22*b*, 22*c* and 22*d* and the warning indicators 28*a*, 28*b*, 28*c* and 28*d*. The relay is used to convert the low current sensor output to a high current signal output which can be used to actuate the warning indicators.

Figure 6:
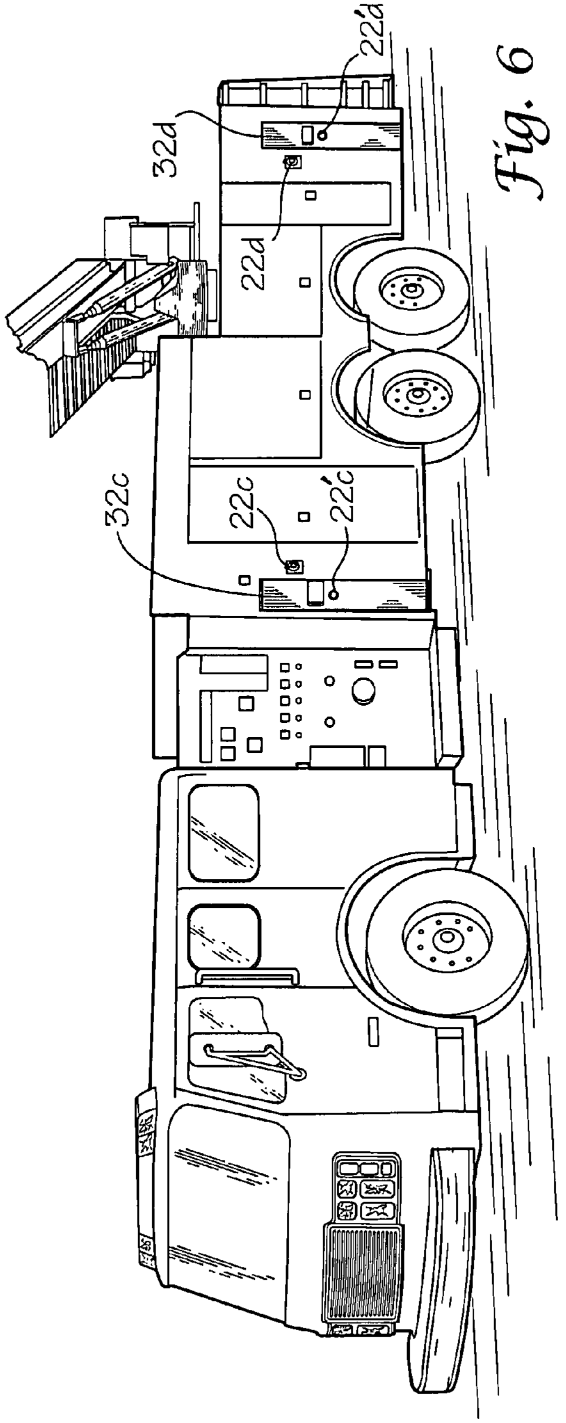
FIG. 6 is a perspective view of an aerial fire truck.
Figure 8:
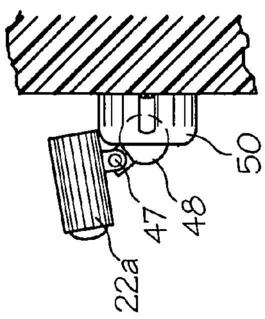
FIG. 8 is a side view of a pivotal mount for a sensor.

FIG. 6 illustrates a perspective view of an aerial fire truck showing the outriggers in the retracted position. In one embodiment, sensor 22*c* is carried by the fire truck in close proximity to an outrigger plate 32*c*. Outrigger plate 32*c* covers the outrigger assembly and is generally flush with the side of the fire truck when the outrigger is in the retracted position. In another embodiment, sensor 22*c* is mounted on the outrigger place 32*c*. Therefore, the sensors can also be mounted in close proximity to the outrigger plate or on the outrigger plate itself.

The actual location of outriggers may vary depending on the type and construction of the outrigger assembly employed on the aerial fire truck. Further, in one embodiment, there may be only two outrigger assemblies on the aerial fire truck.

Figure 7B:
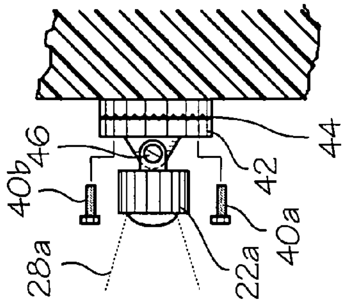
FIG. 7B is a side view of a pivotal mount for a sensor.
Figure 7A:
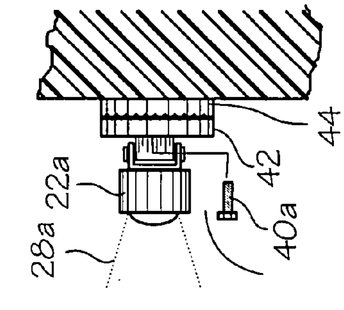
FIG. 7A is a side view of a pivotal mount for a sensor.

Referring to FIG. 7A, sensor 22*a* can be mounted on a pivotal mount. By mounting the sensors on a pivoting mount, the sensors can be positioned so that the sensors sensing areas overlaps that of the outrigger zone. The sensors can be positioned so that the sensor beam path intersects the outermost point of the space occupied by the outrigger when fully extended. In one embodiment, base bracket 44 can be secured to the faire truck. Rotating member 42 can be connected to base bracket 40*a* and 40*b* (FIG. 7B) so that the rotating member can be secured in place or allowed to rotate based upon tightening or loosening of screws 40*a* and 40*b*. Swivel 46 allows the sensor to swivel and in combination with the movement allowed by the rotating member, the sensor can be positioned in two different planes.

In one embodiment, base socket 50 is secured to the fire truck. Ball joint 48 is received in the base socket and allows the sensor to be positioned in two different planes. Swivel 46 can also be used to mount sensor 22*a* to ball joint 48 to allow even further range of positions of the sensor.

In one embodiment, the mount consists of a vehicle mounting bracket, sensor mount bracket and two locking nuts. The "L" shaped vehicle mounting bracket has curved slots on each face, with a hole on the face that mates to the surface of the fire truck 19. The "L" shaped sensor mounting bracket has a round hole to accept the sensor on one face, with two through holes on the other face to mate to the vehicle mounting bracket. Two locking nuts are positioned on the sensor 22*a*, 22*b*, 22*c* and 22*d* and on each side of the face with the through hole on the sensor mounting bracket. This configuration allows the sensor 22*a*, 22*b*, 22*c* and 22*d* to be positioned in 2 different planes, thereby achieving the ability to point the sensor 22*a*, 22*b*, 22*c* and 22*d* along the desired path. In one embodiment, this mount is affixed to the body via hardware, in close proximity to the outrigger assembly, and approximately 2 feet off the ground.

The computer readable instructions can receive a signal from the sensors and then actuate the warning indicator. Further, a parking brake can send a signal to the computer readable instructions so that the computer readable instructions will only actuate the warning indicator according to the sensor signal if the fire truck parking brake is engaged. The power system of the aerial truck can also be in communication with the computer readable instructions so that the warning indicator will only be actuated when power to the aerial apparatus is applied. Further, the outrigger actuator can be in communications with the computer readable instructions so that the outrigger will not be extended if the sensor detects an obstruction in the outrigger zone. In one embodiment, sensors 22*a*, 22*b*, 22*c* and 22*d* can be calibrated to send a signal when an object is detected at a known point in space. In other words, the sensing distance can be set by calibrating the sensor.

In operation, the fire truck operator maneuvers the aerial fire truck 19 into a setup position. Power is applied to the sensors. In one embodiment, sensors, 22*a*, 22*b*, 22*c* and 22*d* start emitting sound pulses at each outrigger location. If an object is detected in any of the outrigger zones, the corresponding sensor will send a signal to a relay. The relay will switch to a normally closed position and send an output to the warning indicator 28*a*, 28*b*, 28*c* or 28*d*, informing the operator of an unsafe setup position. The vehicle can then be repositioned until no obstructions are detected.

In one embodiment, programmable input/output module is used in place of the relay. The programmable I/O module provides power to the ultrasonic sensors 22*a*, 22*b*, 22*c* and 22*d*, controls inputs from the sensors, and provides outputs to the warning indicators 28*a*, 28*b*, 28*c* and 28*d*. The input/output module has built in circuit protection for each output. User defined parameters are programmed to control the switching logic.

In operating, if an object is detected in any of the outrigger zones, the corresponding sensor will send a signal to the programmable input/output module. The programmable input/output module is programmed to send an output to the appropriate warning indicator 28*a*, 28*b*, 28*c* and 28*d* informing the operator of an unsafe setup position.

While a preferred embodiment of the invention has been described using specific terms, such description is for illustrative purposes only, and it is to be understood that changes and variations may be made without departing from the spirit or scope of the following claims.

What is claimed is:

1. An outrigger obstruction detection apparatus for an aerial fire truck having an outrigger comprising:

an outrigger zone defined by an area occupied by the outrigger when the outrigger is in an extended position;

a sensor carried by said fire truck for detecting an obstruction within said outrigger zone; and, a warning indicator operatively associated with said sensor so that said warning indicator is actuated when said sensor detects an obstruction in said outrigger zone.

2. The apparatus of claim 1 including a pivotal mount carried by said fire truck for mounting said sensor to said fire truck.

3. The apparatus of claim 1 wherein said sensor is an ultrasonic sensor.

4. The apparatus of claim 1 including:

an outrigger actuator connected to said outrigger for extending said outrigger in said extended position; and, a relay connected to said outrigger actuator for preventing said outrigger actuator from extending said outrigger when said sensor detects an obstruction in said outrigger zone.

5. The apparatus of claim 1 wherein said sensor is mounted in close proximity to said outrigger.

6. The apparatus of claim 1 including:

an outrigger plate carried by said outrigger; and, said sensor is mounted to said outrigger plate.

7. The apparatus of claim 1 including:

a power supply for providing power to said warning indicator; and, a power switch having an on and off position for allowing power to be applied to said warning indicator when said power switch is in an on position so that said warning indicator will be actuated when said sensor detects an obstruction in said outrigger zone.

8. The apparatus of claim 7 wherein said power switch is placed in said on position by a relay in communication with a parking brake when said parking brake of said fire truck is engaged.

9. The apparatus of claim 7 wherein said power switch is placed in said on position by a relay in communication with an aerial power supply to the aerial apparatus when the aerial power supply provides power to the aerial apparatus of the fire truck.

10. The apparatus of claim 1 including:
a warning panel carried by the interior of the fire truck;
a diagram representing the fire truck included in said warning panel for approximating the location of the outrigger on the fire truck; and,
said warning indicator is carried by said warning panel so that when said warning indicator is actuated, the outrigger affected by said obstruction is indicated on said warning panel.

11. A method for detecting outrigger obstructions for an aerial fire truck having an aerial apparatus comprising the steps of:
detecting whether an obstruction is present within the outrigger zone defined by an area occupied by an extended outrigger of the fire truck through use of a sensor; and,
actuating a warning indicator carried by the fire truck if an obstruction is detected within the outrigger zone.

12. The method of claim 11 wherein said step of detecting whether an obstruction is present within the outrigger zone is performed using an ultrasonic sensor.

13. The method of claim 11 including the steps of:
extending the outrigger if there is no obstruction detected within the outrigger zone; and,
preventing the extension of the outrigger is there are obstructions detected within the outrigger zone.

14. The method of claim 11 wherein the step of detecting whether an obstruction is present within the outrigger zone through use of a sensor is performed upon application of a parking brake of the fire truck.

15. The method of claim 11 wherein the step of detecting whether an obstruction is present within the outrigger zone through use of a sensor is performed upon supplying power to the aerial apparatus of the fire truck.

16. The method of claim 11 wherein the step of actuating a warning indicator carried by the fire truck if an obstruction is detected within the outrigger zone is performed by actuating a warning indicator contained within a warning panel carried by the interior of the fire truck.

17. The method of claim 11 including the steps of:
positioning the aerial fire truck at the scene of a fire/emergency;
repositioning the aerial fire truck if an obstruction is detected within said outrigger zone; and,
extending the outrigger.

18. An outrigger obstruction detection apparatus comprising:
an aerial fire truck having an aerial apparatus;
an outrigger carried by said aerial fire truck having an extended position and a retracted position;
an outrigger zone defined by an area occupied by said outrigger when said outrigger is in said extended position;
a sensor carried by said fire truck for detecting an obstruction within said outrigger zone; and,
a warning indicator operatively associated with said sensor so that said warning indicator is actuated when said sensor detects an obstruction within said outrigger zone.

19. The apparatus of claim 18 including a pivotal mount carried by said fire truck for mounting said sensor to said fire truck.

20. The apparatus of claim 18 wherein said sensor is an ultrasonic sensor.

21. The apparatus of claim 18 including:
an outrigger actuator connected to said outrigger for extending said outrigger in said extended position; and,
a relay connected to said outrigger actuator for preventing said outrigger actuator from extending said outrigger when said sensor detects an obstruction in said outrigger zone.

22. The apparatus of claim 18 wherein said sensor is mounted in close proximity to said outrigger.

23. The apparatus of claim 18 including:
an outrigger plate carried by said outrigger; and,
said sensor is mounted to said outrigger plate.

24. The apparatus of claim 18 including:
a power supply for providing power to said warning indicator; and,
a power switch having an on and off position for allowing power to be applied to said warning indictor when said power switch is in an on position.

25. The apparatus of claim 24 wherein said power switch is placed in said on position by a relay in communication with a parking brake when said parking brake of said fire truck is engaged.

26. The apparatus of claim 24 wherein said power switch is placed in said on position by a relay in communication with an aerial power supply to the aerial apparatus when the aerial power supply provides power to the aerial apparatus of the fire truck.

27. An outrigger obstruction detection apparatus for an aerial fire truck having an outrigger comprising:
a computer readable medium carried by the fire truck;
a sensor in communications with said computer readable medium for detecting an obstruction within an outrigger zone defined by an area occupied by the outrigger when the outrigger is in an extended position;
a warning indicator in communications with said computer readable medium; and,
a set of computer readable instructions embodied in said computer readable medium for receiving a detection signal from said sensor when an obstruction is detected within the outrigger zone and actuating said warning indicator once said detection signal is received.

28. The apparatus of claim 27 wherein said sensor is an ultrasonic sensor.

29. The apparatus of claim 27 including:
an outrigger actuator in communications with said computer readable medium; and,
said computer readable instructions include instructions for extending said outrigger if no obstruction is detected within said obstruction zone.

30. The apparatus of claim 27 including:
a parking brake in communications with said computer readable medium; and,
said computer readable instructions include instructions for receiving a parking brake signal when said parking brake is engaged and only allowing said warning indicator to be actuated after said parking brake signal has been received.

31. The apparatus of claim 27 including:
an aerial apparatus power supply in communications with said computer readable medium; and,
said computer readable instructions include instructions for receiving an aerial apparatus power on signal when said aerial apparatus power supply is on and only allowing said warning indicator to be actuated after said aerial apparatus power supply supplies power to said aerial apparatus.

* * * * *